(12) United States Patent
Quernemoen (10) Patent No.: US 6,542,893 B1
(45) Date of Patent: Apr. 1, 2003

(54) DATABASE SIZER FOR PREEMPTIVE MULTITASKING OPERATING SYSTEM

(75) Inventor: John M. Quernemoen, New Brighton, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/515,308

(22) Filed: Feb. 29, 2000

(51) Int. Cl.[7] .............................................. G06F 17/00
(52) U.S. Cl. .......................... 707/100; 707/10; 707/205
(58) Field of Search ................................ 707/1–4, 7, 8, 707/10, 100–104.1, 200–205; 706/45, 46, 48, 60–62; 711/161, 162, 170–173; 717/100, 104–109; 702/186

(56) References Cited

U.S. PATENT DOCUMENTS

| | | | |
|---|---|---|---|
| 4,804,950 A | * 2/1989 | Moon et al. ................. | 345/173 |
| 5,065,360 A | 11/1991 | Kelly .......................... | 708/142 |
| 5,091,852 A | * 2/1992 | Tsuchida et al. ............... | 707/2 |
| 5,222,235 A | * 6/1993 | Hintz et al. .................... | 703/22 |
| 5,299,115 A | * 3/1994 | Fields et al. ................... | 700/99 |
| 5,404,510 A | * 4/1995 | Smith et al. ................. | 706/934 |
| 5,452,447 A | * 9/1995 | Nelson et al. ............... | 707/205 |
| 5,617,514 A | 4/1997 | Dolby et al. .................. | 706/45 |
| 5,630,025 A | 5/1997 | Dolby et al. .................. | 706/46 |
| 5,745,904 A | * 4/1998 | King et al. ................. | 707/200 |
| 5,832,182 A | * 11/1998 | Zhang et al. ............... | 382/226 |
| 5,839,438 A | * 11/1998 | Graettinger et al. ........ | 128/904 |
| 5,852,818 A | * 12/1998 | Guay et al. ..................... | 707/1 |

(List continued on next page.)

OTHER PUBLICATIONS

Compaq Computer Corporation, "White Paper", 5 pages, Jun. 1998.

Kim Shanely, "History and Overview of the TPC", 14 pages, Feb. 1998.
"TPC–C Results—Revision 3X", downloaded from www.tpc.org, 4 pages, dated prior to Feb. 29, 2000.
"TPC–R Benchmark", downloaded from www.tpc.org, 2 pages, dated prior to Feb. 29, 2000.
"TPC–H Benchmark", downloaded from www.tpc.org, 2 pages, dated prior to Feb. 29, 2000.
Jack Stephens, "TPC–D The Industry Standard Decision Support Benchmark", 28 pages, dated prior to Feb. 29, 2000.
Select pages from www.tpc.org, 12 pages, downloaded Nov. 2, 1999.
User Guide, Compaq System Sizer v8.1 for Oracle8i NT4.0, Compaq Computer Corporation, Jun. 1999, pp. 1–40.
User Guide, Compaq Sizer 2.30 for Microsoft SQL Server 7.0, Compaq Computer Corporation, Oct. 1999, pp. 1–44.
"TPC–D Benchmark", downloaded from www.tpc.org. 6 pages, dated prior to Feb. 29, 2000.

*Primary Examiner*—Greta Robinson
*Assistant Examiner*—Harold E. Dodds, Jr.
(74) *Attorney, Agent, or Firm*—Charles A. Johnson; Mark T. Starr; Crompton, Seager & Tufte, LLC (57) ABSTRACT

Methods for calculating total mass storage requirements for a relational database table including database storage requirements, application and software requirements, system table requirements, scratch and sort requirements, log file requirements, and growth requirements. One method utilizes detailed inputs for each table and table index. Another method produces and utilizes estimates for the database and index requirements for all tables together. Methods can use input parameters including the page size, a fill factor, the log file space, the temporary space, the operating system and application software space, the system database space, the growth percent space, and the page file space. Some methods also take into account inputs such as the number of table, the amount of data, the average number of columns per row, the average row size, the percent of variable length columns, and the average variable length column size per table.

15 Claims, 7 Drawing Sheets

U.S. PATENT DOCUMENTS 5,862,481 A * 1/1999 Kulkarni et al. ............. 455/432
6,003,022 A * 12/1999 Eberhard et al. ............... 707/2
6,112,209 A * 8/2000 Gusack .......................... 707/1
6,272,549 B1 * 8/2001 Daniel ........................ 709/206
6,351,754 B1 * 2/2002 Bridge et al. ................ 707/202
6,377,958 B1 * 4/2002 Orcutt ......................... 707/200
6,397,223 B1 * 5/2002 Kori ............................. 707/1
2001/0054031 A1 * 12/2001 Lee et al. ................... 705/406

* cited by examiner

DATABASE SIZER FOR PREEMPTIVE MULTITASKING OPERATING SYSTEM

CROSS-REFERENCE TO RELATED APPLICATIONS

The present application is related to the following co-pending applications filed on date even herewith: U.S. application Ser. No. 09/515,310, filed Feb. 29, 2000, entitled SIZING SERVERS FOR DATABASE MANAGEMENT SYSTEMS VIA USER DEFINED WORKLOADS; U.S. application Ser. No. 09/514,801, filed Feb. 29, 2000, entitled COMBINATION OF MASS STORAGE SIZER, COMPARATOR, OLTP USER DEFINED WORKLOAD SIZER, AND DESIGN; U.S. application Ser. No. 09/515,158, filed Feb. 29, 2000, entitled titled BUILT IN HEADROOM FOR AN NT SYSTEM SIZER; U.S. application Ser. No. 09/516,272, filed Feb. 29, 2000, entitled ALGORITHMS TO CALCULATE MASS STORAGE REQUIREMENTS FOR NT SIZER; and U.S. application Ser. No. 09/514,506, filed Feb. 29, 2000, entitled METHOD OF COMPARISON FOR COMPUTER SYSTEMS AND APPARATUS THEREFOR. All of the aforementioned co-pending patent applications are hereby incorporated by reference.

FIELD OF THE INVENTION

The present invention is related generally to computers and database software. More specifically, the present invention is related to software for sizing relational database management systems (RDBMSs). The present invention includes methods for determining the required size for database storage.

BACKGROUND OF THE INVENTION

Relational databases came into common use in computers over twenty years ago. Despite improvements in database software and new methodologies, relational databases remain the mainstay of database management systems. Hardware vendors originally supported proprietary database management systems which ran primarily on machines manufactured by the hardware vendor. Software developers later developed database management systems that were more open and ran on computers made by several vendors. The database management systems were also ported to run under various operating systems. This gave the advantage of spreading the cost of development over more sites and also uncoupled the dependence between hardware vendors and software vendors. Third party support and training also became more common.

Database management systems also became separated into client-side software and server-side software. This meant that the server-side software was decoupled from software having to do with the display, use, and formatting of the data received from the database. In particular, server-side software often handled mostly queries of existing data along with updates of existing data and insertion of new data.

Modern electronic commerce such as commerce over the Internet or business-to-business electronic commerce has placed increased demands on many servers. This has also made frequent upgrades necessary. Company mergers and acquisitions frequently make it necessary to incorporate large amounts of data from unexpected sources. Customer expectations also make it necessary to upgrade hardware to keep up with the faster response times users expect even though system loads may be increasing as well.

When upgrading or replacing database servers, it is necessary to have a good idea as to the size of the database that will have to be implemented on the new server. The data storage as well as storage of many different indices will all increase the amount of data required. It may be necessary to come up with a good estimate of the required amount of mass storage in a short time period, as during bid evaluations, during sales presentations, or repeatedly during scenario building. The person supplying the input may have only a rough idea as to the database mass storage requirements.

What would be desirable are methods for quickly calculating the data storage requirements for relational database systems capable of using either estimated or detailed requirements as input.

SUMMARY OF THE INVENTION

The present invention includes methods for estimating the required bytes of mass storage for a database management system using detailed inputs and parameters. An illustrative method includes the steps of: providing detailed inputs for tables in the database sufficient to calculate the required table size for each table; providing detailed inputs for each index for each table in the database sufficient to calculate the required index size for each table; providing input parameters for each RDBMS including the page size, the fill factor, the log file space, the temporary space, as a percent of the formatted database size including indexes, the space required for Operating System and application software, the space required for system databases, the percent growth required for the database, and the page file space; calculating a total storage requirement for the database using the inputs and input parameters; and calculating a storage requirement for the data base management system using the inputs and input parameters. In one method, the calculated storage requirements include separately output Operating System and application software space requirements, system table space requirements, scratch and sort space requirements, and log file space requirements.

Another illustrative embodiment includes a method for estimating the required bytes of mass storage for a database management system using estimated inputs and parameters. An illustrative method includes the steps of: providing inputs for tables in the database sufficient to calculate the estimated size for the database including the number of tables, the amount of data, the average number of columns per row, the average row size, the percent variable length columns, and the average variable length column size per table; providing input parameters for each RDBMS including the page size, the fill factor, the log file space, the temporary space, as a percent of the formatted database size including indexes, the space required for Operating System and application software, the space required for system databases, the percent growth required for the database, and the page file space; providing assumptions including the average number of non cluster indexes per table, the average number of fixed length fields per non cluster index, the average number of cluster indexes per table, the average number of fixed length fields per cluster index, the number of variable length fields per cluster index; and calculating a storage requirement for the data base management system using the inputs, input parameters, and assumptions. In one embodiment of the aforementioned method, the calculated storage requirements separately output Operating System and application software space requirements, system table space requirements, scratch and sort space requirements, and log file space requirements.

DETAILED DESCRIPTION OF THE INVENTION

Figure 1:
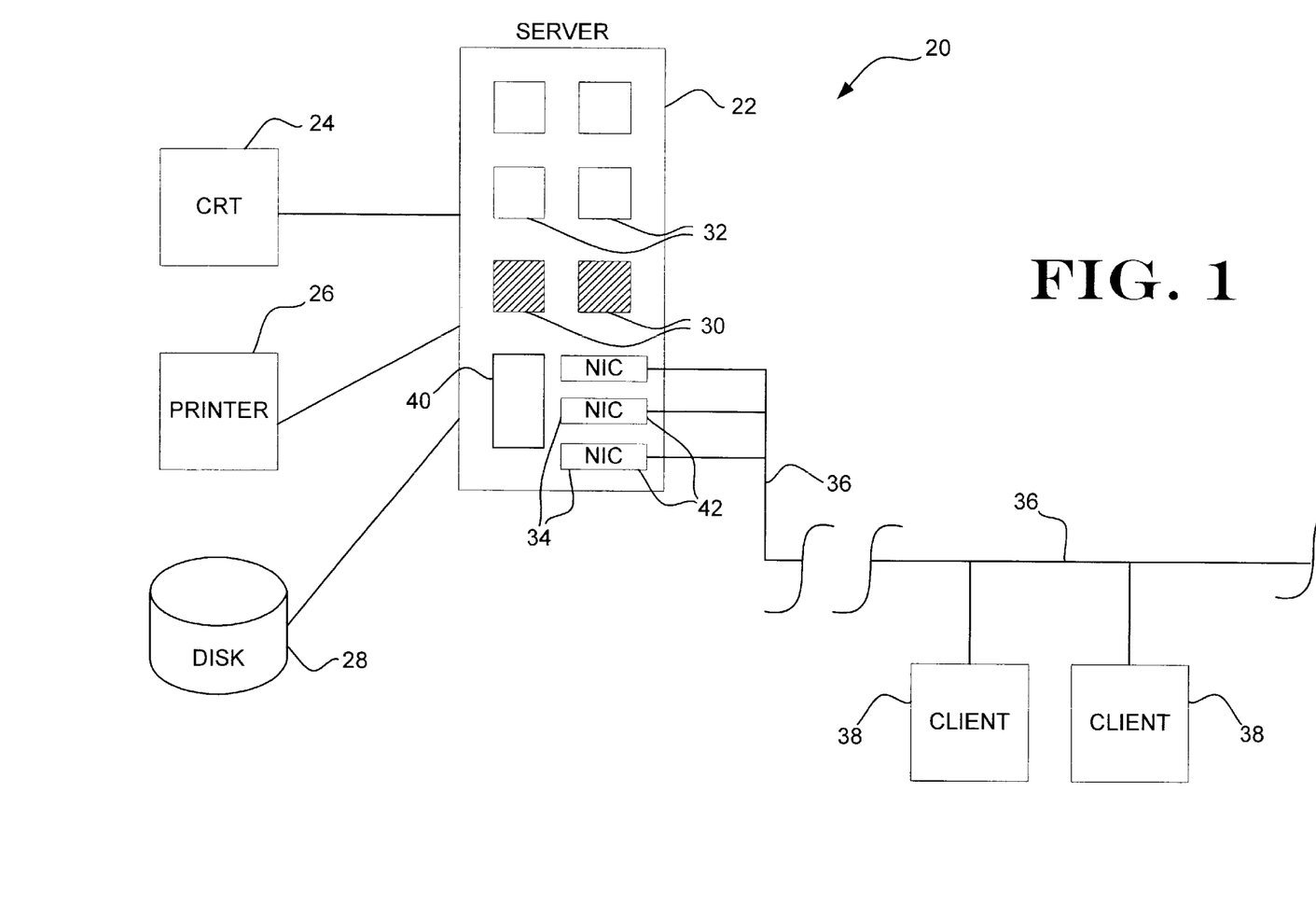
FIG. 1 is a highly diagrammatic schematic of a computer system including a database server.

FIG. 1 illustrates generally a database server system 20 including a server 22 supported by a CRT 24 and a printer 26 for programming, display, maintenance, and general Input/Output uses. Within server 22 is illustrated several CPU sockets 30 and 32, with CPU sockets 30 being populated with CPUs and CPU sockets 32 remaining empty for future expansion and population. Server 22 also includes a memory portion 40 which can contain a sufficient quantity of Random Access Memory (RAM) to meet the server's needs. A disk 28 is illustrated for mass storage, which can include disk drives or any other technology capable of holding the contents of the databases or databases to be managed. Several Network Interface Cards (NICs) 42 are illustrated as part of server 22 and are coupled to a network illustrated by a network link 36 which can be any communication link including Local Area Networks, Wide Area Networks, Ethernet, and the Internet.

Also connected to data link 36 are client computers 38. Software clients can, in fact, reside on the same machine as the server, but in common practice, the client processes usually run on a different machine. In one embodiment, server 22 is a computer running on the Microsoft NT operating system and clients 38 are smaller computers running a Microsoft Windows operating system.

Server 22 is preferably scaleable, having extra socketed capacity for memory, processors, NICs, and disk drives. This allows extra CPUs, memory, NICs, and mass storage such as disk drives to be initially set to meet current needs and later expanded to meet changing needs.

Figure 2:
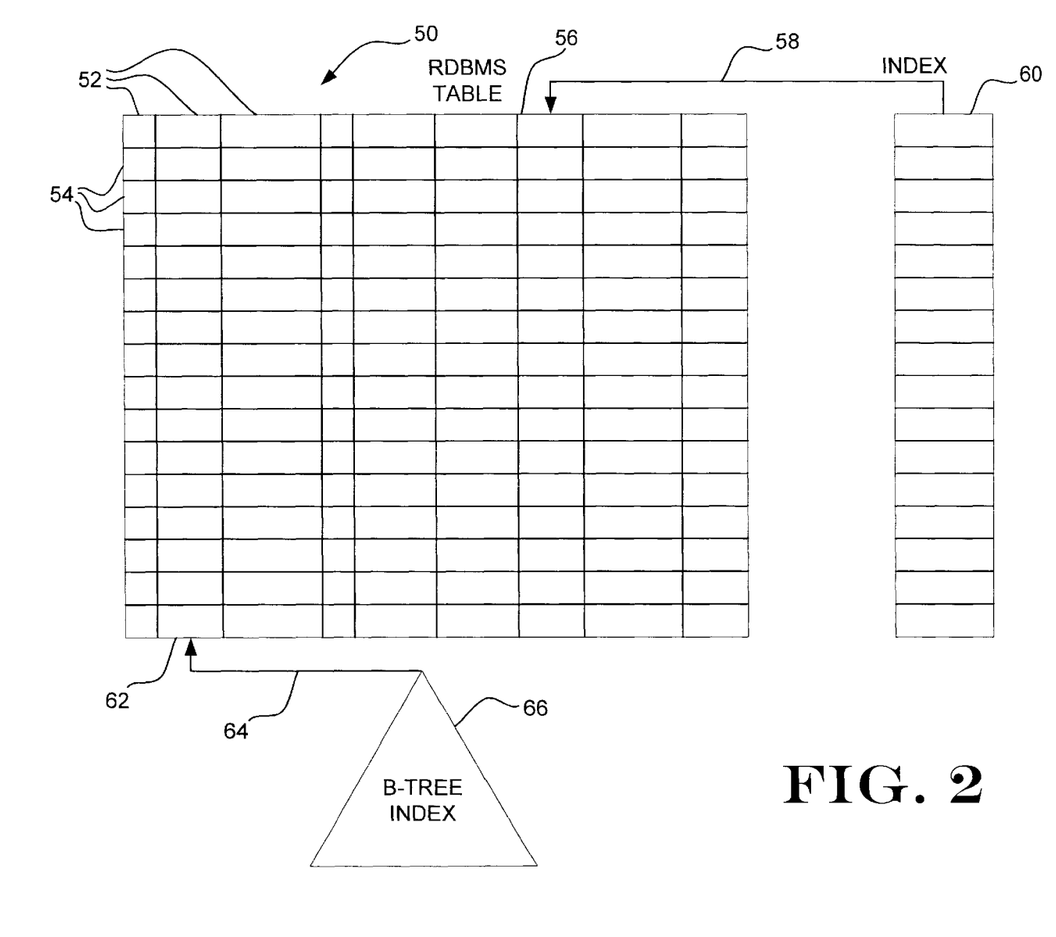
FIG. 2 is a highly diagrammatic view of a relational database.

Servers such as server 22 often exist to contain and manage data bases, such as those contained within relational database management systems (RDBMS). RDBMS include tables formed of rows or records and columns. FIG. 2 illustrates an RDBMS table 50 formed of several columns 52 and several rows or records 54. Columns 52 typically include both fixed length or width columns and variable length or width columns, where the variable length may be allocated out of a common buffer elsewhere outside of the table itself. In practice, an RDBMS system has numerous tables to be stored and managed.

It is possible for rows 54 to be ordered according to one of the columns. In practice however, the records are typically not ordered, but are linked to indices that are ordered. In a simple example, one of columns 52, such as column 56, may contain a person's social security number and be linked via a software link 58 to an ordered index 60 which contains a sorted list of social security numbers along with the record number at which the corresponding record resides. Such a sorted list of only one column of table 50 can shorten a search from order n to order log n. Such a sorted list still requires sorting upon the addition, deletion, and change of data.

A commonly used index method is illustrated for column 62, which is linked via a software link 64 to a B-tree index 66. B-tree 66 can contain a multi-level tree well known to those skilled in the software arts. B-tree 66 can be a multi-way tree such as an AVL tree or a 2–3 tree. B-tree indices have the advantage of being quick and easy to modify, without requiring massive amounts of sorting such as in a linear sorted index such as index 60. In particular, a B-tree can be maintained in a balanced condition with the addition of data to avoid skewing the shape of the tree. Maintaining the balance of the tree allows a log n search time to be maintained as well.

In practice, an RDBMS may use only a B-tree for the indexing scheme, due to its utility and flexibility. An RDBMS may maintain a B-tree on any column for which ordered searching may be later requested. As the number of columns to be indexed approaches the number of columns in the table, the data storage requirements for the indices themselves approach and pass the data storage requirements of the table itself. Thus, the data storage requirements of the indices are an important factor to be considered when determining the mass storage requirements for a table and RDBMS.

Figure 3:
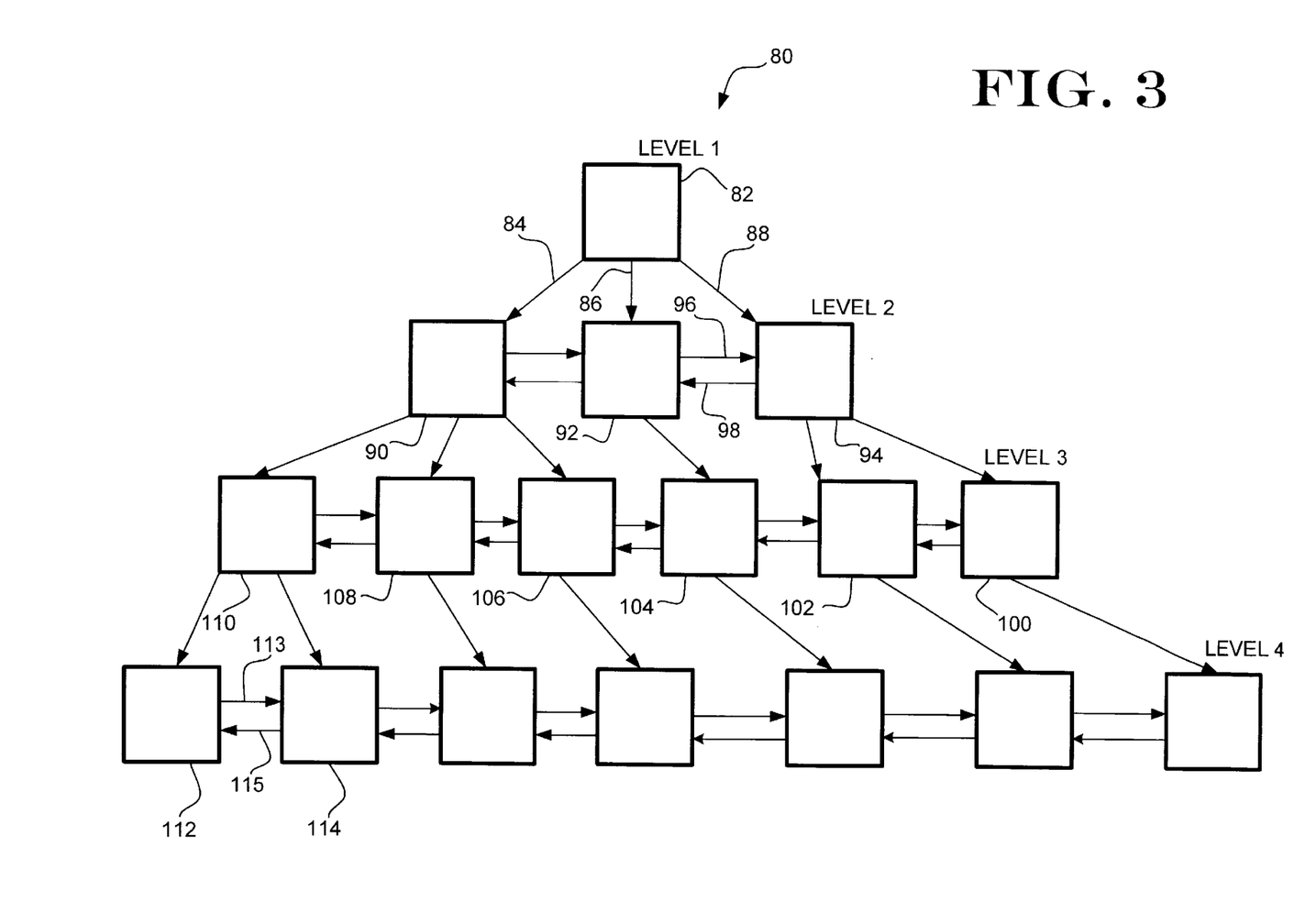
FIG. 3 is a highly diagrammatic view of a B-tree index for a relational database.

FIG. 3 illustrates a B-Tree 80 including a root node 82 at level 1 having three links 84, 86, and 88 to nodes 90, 92, and 94 respectively at level 2. The nodes at level 2 are illustrated as being doubly linked themselves through links such as links 96 and 98. Links between nodes at the same level, such as links 96 and 98, make maintenance of the B-tree somewhat easier, and browsing can be made somewhat easier as well through use of such links. At level 3, links 100, 102, 104, 106, 108, and 110 are pointed to by the links at level 2. Level 4 is the last level in the tree. B-tree 80 has four levels, or a tree height of four. Level 4 may be said to be the "failure level" of the tree, as level 4 is the level at which a search of the tree will fail if it is to fail. If a value such as a social security number is searched for but there is no such record in the database, level 4 is the level at which the search will fail. At level 4, nodes 112 and 114 are linked together as a doubly linked list by links 113 and 115. In practice, the failure level of a B-Tree is often linked together in this or a similar manner.

In a B-tree, the nodes in the B-tree typically contain only the key or column values the tree is ordered for and points to nodes in the next level related to those keys or column values. For example, in a two-way tree, a node would have one index value, and two pointers, indicating which nodes to go to for values greater than or less than the index value, respectively. B-Trees and databases vary in what they have at the failure level. In some databases, herein termed "physical ordered databases", the failure level has the records themselves linked together. In these databases, once the failure level is reached, the record has been obtained, with no further I/O necessary to obtain the record. In other databases, herein termed "non-physical ordered databases", the nodes at the failure level contain only pointers or record numbers into the main table. In these databases, another I/O is required to obtain the record of interest. In some databases, the failure level contains neither the record of interest nor a pointer to the record of interest. Instead, a unique key is contained, requiring a search on that key to obtain the record of interest. For example, a search of B-Tree ordered on last name plus first name may return only a social security number upon successful completion. Another B-tree or highly optimized index based on social security number can then be rapidly searched for the record of interest. In this scheme, at least one more I/O is required after the failure level has been reached. The number I/Os required to reach a record is of interest to because it determines in part the speed of the database. Both disk I/O and network I/O require latent time to process.

In sizing a database, the RDBMS typically has a page size, or an aggregate unit of mass storage typically numbering thousands of bytes. The page size on some computers may be determined in part by operating system and disk system factors. The page size may also be determined by a desire to keep the width of internal variables within the database to manageable limits. The page size is fixed in some RDBMSs and selectable in other RDBMSs.

The amount of mass storage required for a single table is a function of several variables, such as the number of rows or records and the number of columns. The database storage required is not a simple calculation of the row size and column sizes for several reasons. First, the column sizes or widths may be variable. Second, the page size enters into the calculation in a non-continuous manner, as some database allocation such as record allocation must lie within a single page rather than cross page boundaries, with some space wasted as a result. Third, some space in a page is set aside for future expansion or reserved for use a buffer space, as when re-ordering data. Fourth, not all space within a page is available for end user data storage, with some being used by the RDBMS itself or for other overhead. In particular, in some RDBMSs, a fraction of each page is specified as not available for initial storage. In some RDBMSs, a number of rows are set aside as non-usable. In some RDBMSs, a fraction of each record is set aside as non-usable. As previously mentioned, the size of the indices may be a large portion of table storage even though the data itself may not be stored within the indices. All of the aforementioned factors makes sizing the required databases a complicated matter, as is dealt with below.

Figure 4:
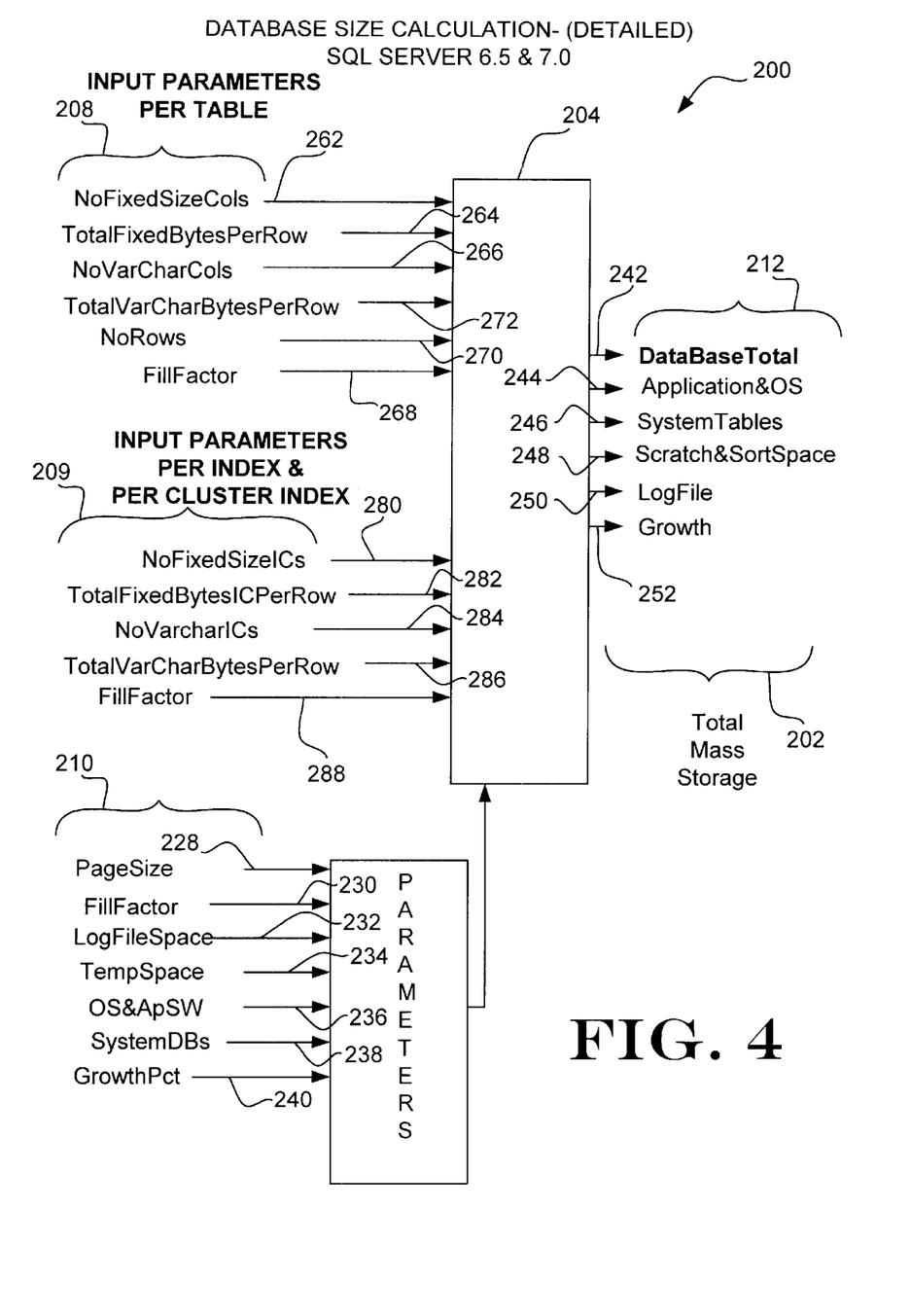
FIG. 4 is a simplified data flow diagram illustrating a method used to determine the total mass storage requirements for an SQL Server system based on detailed inputs.

Referring now to FIG. 4, a simplified data flow diagram illustrates the data inputs and outputs for a method 200 used to calculate the total mass storage required for a RDBMS system, where the total mass storage is represented by TotalMassStorage 202. Method 200 is the method termed "detailed" in the present application, based on detailed knowledge of the database requirements and input of those requirements. In particular, the detailed inputs are those inputs used to determine the required mass storage required for each table, including the storage required for the data and the indexes such as B-tree indexes. In a preferred embodiment, the detailed inputs and methods are those provided by related U.S. application Ser. No. 09/516,272, filed Feb. 29, 2000, entitled ALGORITHMS TO CALCULATE MASS STORAGE REQUIREMENTS FOR NT SIZER, herein incorporated by reference and hereinafter referred to as the "co-pending algorithm patent application".

Method 200 utilizes user entered inputs 208 and 209 as well as user entered parameters 210. Parameters 210 and inputs 208 and 209 are operated on by a method represented by box 204. Method 204 generates outputs 212 which can be summed or otherwise processed to obtain TotalMassStorage 202. One output, DataBaseTotal 242, can be generated in the detailed case on a table-by-table basis for each table in the database using the methods described in the co-pending algorithm patent application.

Inputs 208 can be entered for each table in the database and can include: the number of fixed size columns represented by NoFixedSizeCols 262; the total fixed bytes per row represented by TotalFixedBytesPerRow 264; the number of variable size (varchar) columns represented by NoVarCharCols 266; the total varchar bytes per row represented by TotalVarCharBytesPerRow 272; the number of rows represented by NoRows 270; and the fill factor represented by FillFactor 268, which can be termed a fill factor for DBMSs such as SQL Server and as 100−PCTFREE for RDBMSs such as Oracle.

Inputs 209 can be entered for each index in the database or for each clustered index in the case of a RDBMS such as SQL Server, and can include: the number of fixed size index columns represented by NoFixedSizeIC 280; the total fixed bytes of index columns per row represented by TotalFixedBytesICPerRow 282; the number of varchar index columns represented by NoVarCharICs 284; the total varchar bytes of index columns per row represented by TotalVarCharBytesICPerRow 286; and the fill factor represented by FillFactor 288, which can be a fill factor for RDBMSs such as SQL Server and 100−PCTFREE for RDBMSs such as Oracle.

Parameters 210 can be entered by the user and, in the preferred embodiment, include default values. Parameters 210 can include: the page size, represented by PageSize 228, which is preferably pre-set to the value for the selected RDBMS; the fill factor, represented by FillFactor 230; the log file space, as a percent of the formatted database size including indexes, represented by LogFileSpace 232; the temporary space, as a percent of the formatted database size including indexes, represented by TempSpace 234; the space required for Operating System and application software, represented by OS&ApSW 236; the space required for system databases, represented by SystemDBs 238; and the percent growth required for the database, represented by GrowthPct 240. Parameters 210 are also input into method 204 along with inputs 208 and 209.

In a preferred embodiment, method 204 utilizes the algorithms previously 20 referenced in the aforementioned co-pending algorithm patent. In one embodiment, FillFactor 230 defaults to 95 percent, LogFileSpace 232 defaults to 25 percent, TempSpace 234 defaults to 35 percent, OS&APSW 236 defaults to 1 GB, SystemDBs 238 defaults to 0.1 GB, and GrowthPct 240 defaults to 25 percent. The inputs, input parameters per index, and parameters discussed below are mainly used to obtain the output DataBaseTotal 212.

Method 204 operates on inputs 208 and 209, and on parameters 210, to generate outputs 212. Outputs 212 include: the data base total GB, represented by DataBaseTotal 242; the application and operating system space, represented by Application&OS 244; the system table requirement, represented by SystemTables 246; the required scratch and sort space, represented by Scratch&SortSpace 248; the required log file space, represented by Logfile 250; and the growth space, represented by Growth 252. Outputs 212 can be summed together to obtain the total mass storage required, represented by TotalMassStorage 202.

To obtain outputs 212 from inputs 208, 209, and 210, in a preferred embodiment, the method described below can be used. The input names used in FIG. 4 correspond to variable names used in the co-pending algorithm patent application, with the corresponding names included below. Input parameters per table 208 include those in Table 1 below. The following table gives the correlation between the input parameters in FIG. 4 of the present application with the variable names used with respect to Figures in the co-pending algorithm patent application.

TABLE 1

| FIG. 4, present application | Co-pending algorithm patent application |
|---|---|
| NoFixedSizeCols 262 | FixedCol_D |
| TotalFixedBytesPerRow 264 | FixedBytes_D |
| NoVarCarCols 266 | VarCol_D |
| TotalVarCharBytesPerRow 272 | VarBytes_D |
| NoRows 220 | nRcd |
| FillFactor 268 | FillFactor_D |

The inputs can be used to determine a value for RowSize_D, as discussed in the co-pending algorithm patent application, using the formula below in equation 1. The formula in equation 1 for RowSize_D is vendor dependent. The calculation is based on the column sizes, the number of columns, the type of columns, and the manner in which the RDBMS vendor has designed the row format and access within a page. The formulas such as equation 1 below, as well as later introduced formulas for index row size, are supplied for completeness of description and as a convenience to the reader.

$$RowSize\_D=[(2+FixedBytes\_D+VarBytes\_D)+(((2+FixedBytes\_D+VarBytes\_D)/256+1)+(VarCol\_D+3))*(VarCol\_D>0)] \quad (1)$$

RowSize_D can be used as an input as illustrated and described with respect to RowSize_D 214 of FIG. 4 of the co-pending algorithm patent application. FillFactor 268 can be used as illustrated and described with respect to FillFactor_D 208 of FIG. 4, and NoRows 270 can be used as described with respect to nRcd 220 of FIG. 4 of the co-pending algorithm patent application.

Input parameters per index 209 can be used to represent both the physical order indexes and the non-physical order index described in the co-pending algorithm patent application, where the clustered indexes or physical order index variable names end in _K and the non-physical order index variable names end in _X, denoted in the following discussion with either the _K suffix, the _X suffix, or an _K/X suffix, to denote either or both.

Table 2 gives the correlation between the input parameters in FIG. 4 of the present application with the variable names used with respect to Figures in the co-pending algorithm patent application.

TABLE 2

| FIG. 4 | Physical Order Indexes | Non-Physical Order Indexes |
|---|---|---|
| NoFixedSizeICs 280 | FixedCol_K | FixedCol_X |
| TotalFixedBytesICPerRow 282 | FixedBytes_K | FixedBytes_X |
| NoVarCharICs 284 | VarCol_K | VarCol_X |
| TotalVarCharBytesPerRow 286 | VarBytes_K | VarBytes_X |
| FillFactor 288 | FillFactor_K | FillFactor_X |

RowSize_K and RowSize_X can be calculated using the formulas below, as described in the co-pending algorithm patent application, where S is an intermediate value.

$$RowSize\_K=[(5+FixedBytes\_K+VarBytes\_K)+(((5+FixedBytes\_K+VarBytes\_K)/256+1)+(VarCol\_K+3))*(VarCol\_K>0)] \quad (2)$$

$$S(7+FixedBytes\_X+VarBytes\_X+VarCol\_X) \quad (3)$$

$$RowSize\_L=[S+((S+3)/256+4)*(VarCol\_X>0)] \quad (4)$$

$$RowSize\_X=RowSize\_L+4 \quad (5)$$

Figure 6:
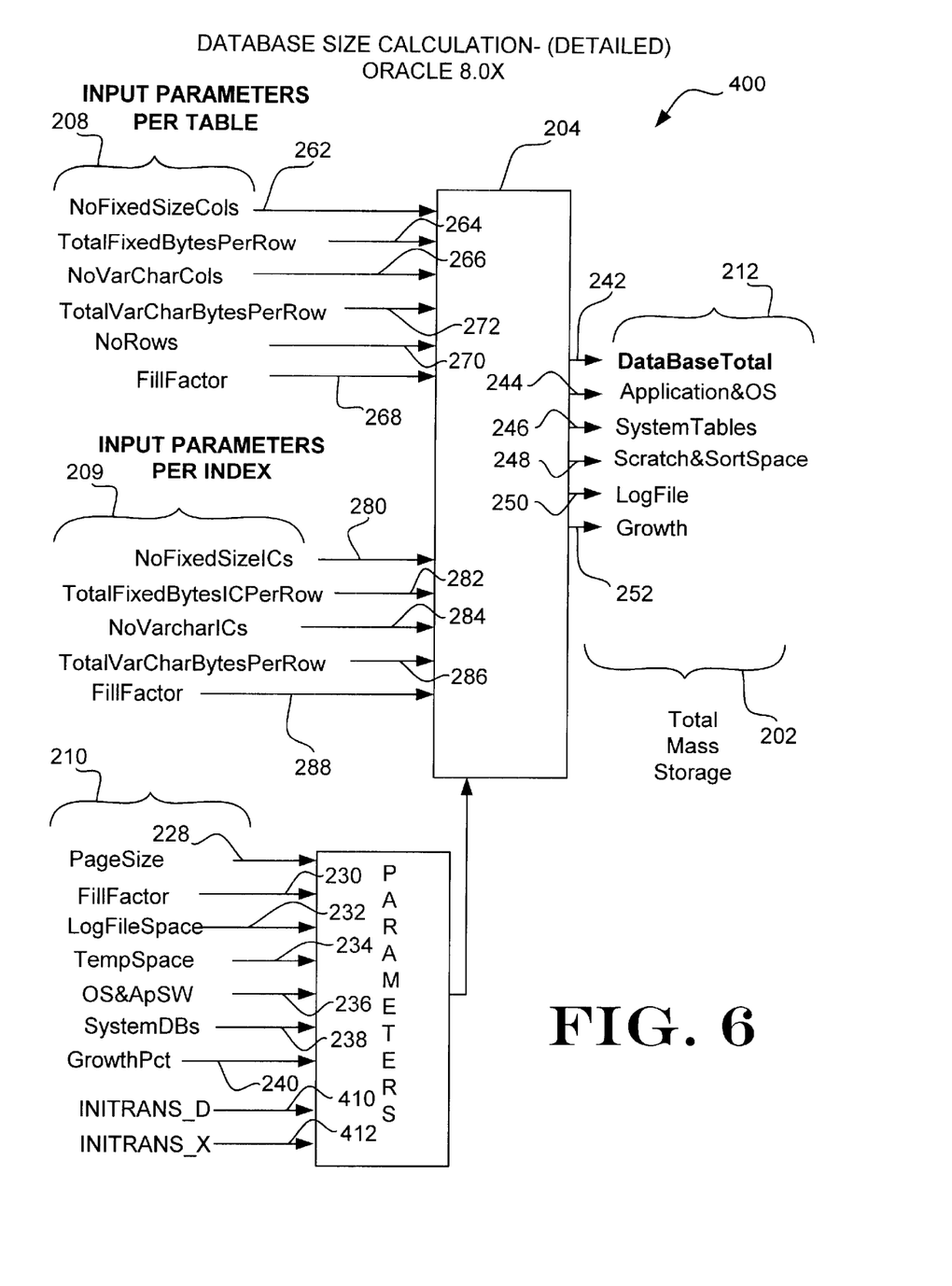
FIG. 6 is a simplified data flow diagram illustrating a method used to determine the total mass storage requirements for an Oracle system based on detailed inputs.
Figure 7:
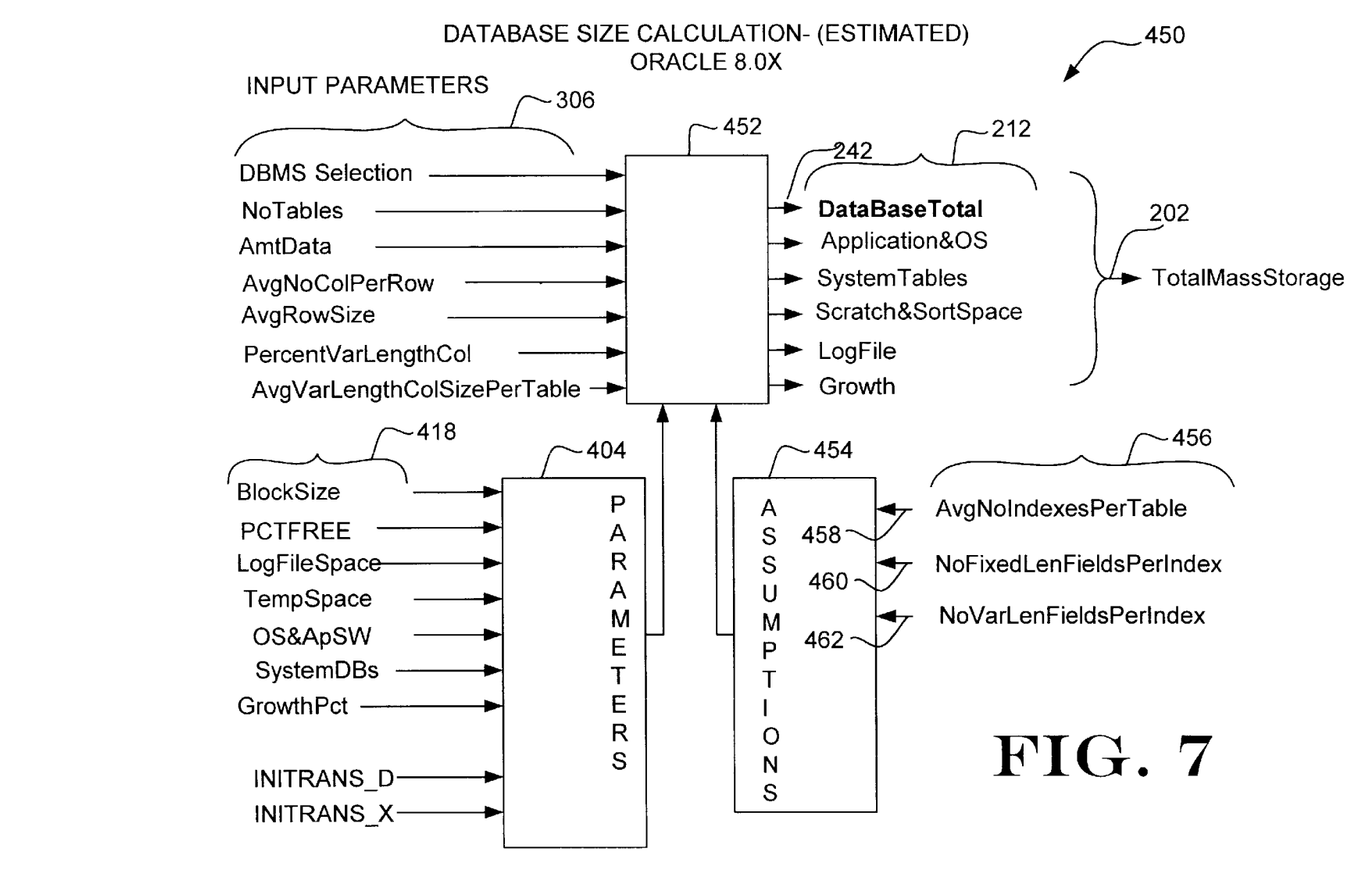
FIG. 7 is a simplified data flow diagram illustrating a method used to determine the total mass storage requirements for an Oracle system based on estimated inputs.

FillFactor 288 can be used as an input as FillFactor_K and FillFactor_X in FIGS. 6 and 7 of the co-pending algorithm patent application.

Method 200 also uses parameters 210 as inputs. PageSize 228 can be user entered, and, as discussed in the co-pending algorithm patent application, can be reduced by 32 or 96 to become the PageSize_D variable used in that algorithm for SQL Server 6.5 or SQL Server 7.0, respectively. FillFactor 230 corresponds to FillFactor_D described in the co-pending algorithm application. LogFileSpace 232 can be entered as a percent of DataBaseTotal 242, to be used to calculate LogFile 250 size using the relation:

$$LogFile=DataBaseTotal*(LogFileSpace/100) \quad (6)$$

TempSpace 234 can be entered as a percent of DataBaseTotal 242 with output Scratch&SortSpace 248 thus being a function of TempSpace 234 and DataBaseTotal 242, using the relation Scratch&SortSpace=DatabaseTotal*TempSpace/100

OS&ApSW 236 represents the operating system and application software space required and can be user supplied and passed straight through to become output Application& OS 244. Similarly, SystemDBs 238 represents the size of the system database, which holds the data dictionary, etc.; it can be entered as a number of bytes such as a megabytes and can be user entered based on vendor supplied information for the RDBMS and can be passed straight through to become SystemTables 248. GrowthPct 240 can be entered as a percent of DataBaseTotal 242 to be reserved for growth and can be user entered and used to calculate the output Growth 252, using the relation Growth=DatabaseTotal*(1+GrowthPct/100).

Figure 5:
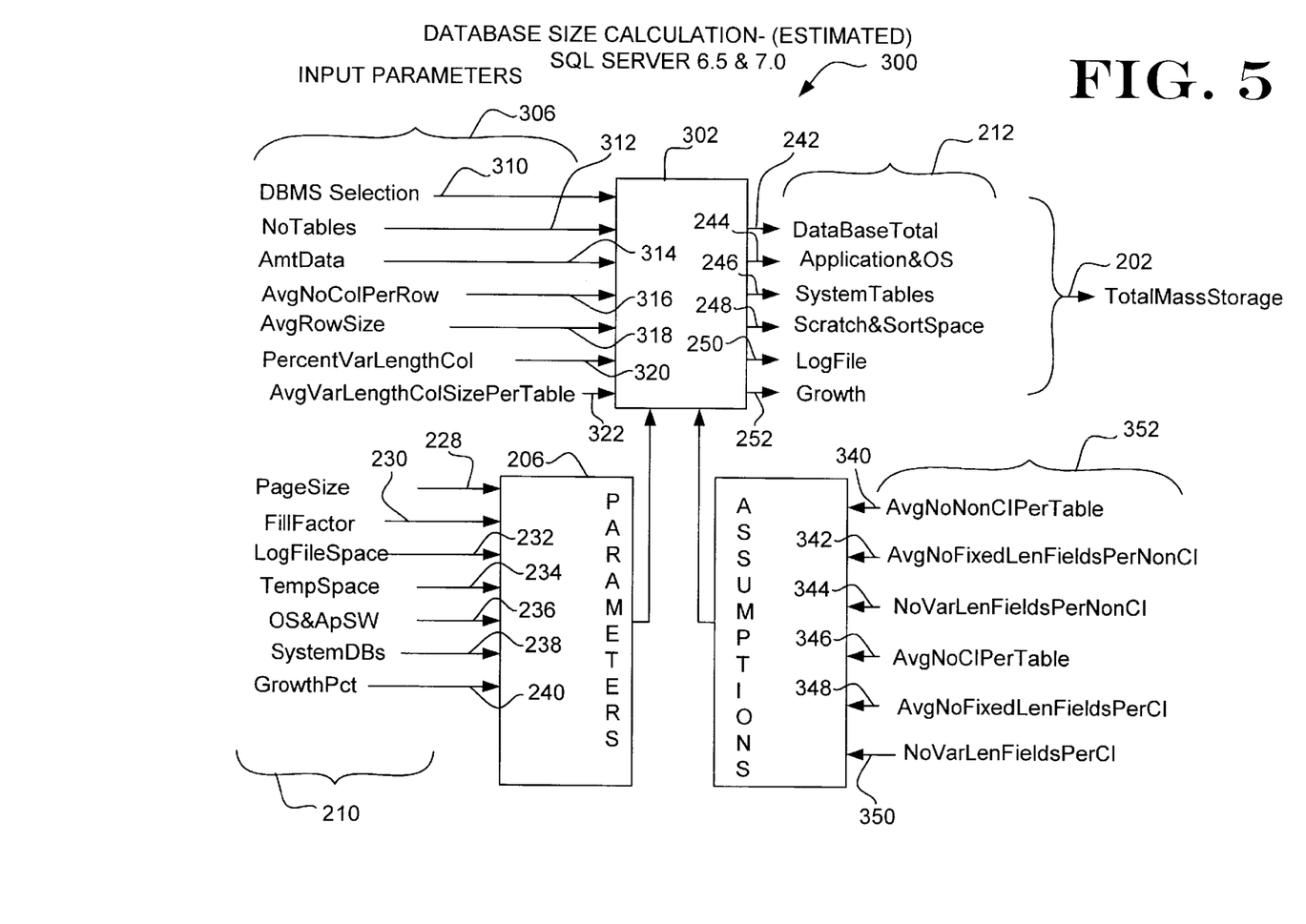
FIG. 5 is a simplified data flow diagram illustrating a method used to determine the total mass storage requirements for an SQL Server system based on estimated inputs.

Referring now to FIG. 5, a method 300 is illustrated for calculating the required total mass storage for a RDBMS system such as a SQL server system, with the total requirement represented by TotalMassStorage 202. Method 300 uses estimated mass storage requirements for the table and index requirements, as opposed to the detailed method previously described. In particular, DataBaseTotal 242 can be calculated using estimates. A method or algorithm 302 is used to operate on several user entered inputs 306, several assumptions 352, and parameters 210, where parameters 210 are as previously described with respect to FIG. 4. Similarly named and numbered variables may, of course, have different values in the different methods and embodiments.

Inputs 306 are user entered inputs and can include: the RDBMS selection, represented by RDBMSSelection 310, the number of tables, represented by NoTables 312; the amount of data, represented by AmtData 314; the average number of columns per row, represented by AvgNoColPerRow 316; the average row size, represented by AvgRowSize 318; the percent variable length columns, represented by PercentVarLengthCol 320; and the average size of variable length columns per table, represented by AvgVarLengthColSizePerTable 322. In one embodiment, the average number of columns per row defaults to 10, and the percent variable length columns defaults to 15.

Method 302 also utilizes several assumptions 352 which can include: the average number of non-clustered indexes per table, represented by AvgNonClPerTable 340; the average number of fixed length fields per non-clustered index, represented by AvgNoFixedLenFieldsPerNonCI 342; the number of variable length fields per non-clustered index, represented by NoVarLenFieldsPerNonCI 344; the average number of clustered indexes per table, represented by AvgNoCIPerTable 346; the average number of fixed length fields per cluster index, represented by AvgNoFixedLenFieldsPerCI 348; and the number of variable length fields per cluster index, represented by NoVarLenFieldsPerCI 350.

In one embodiment, used for SQL server 6.5, the average number of non-clustered indexes per table, represented by AvgNonClPerTable 340, defaults to 0.3; the average number of fixed length fields per non-clustered index, represented by AvgNoFixedLenFieldsPerNonCI 342, defaults to 1.2; the number of variable length fields per non-clustered index, represented by NoVarLenFieldsPerNonCI 344, defaults to 0; the average number of clustered indexes per table, represented by AvgNoCIPerTable 346, defaults to 1; the average number of fixed length fields per cluster index, represented by AvgNoFixedLenFieldsPerCI 348, defaults to 1.3; and the number of variable length fields per cluster index, represented by NoVarLenFieldsPerCI 350, defaults to 0. The values can be entered through a standard windows dialog box, such as provided by Windows 98 or any other suitable operating system.

Table 3 cross references the variable names and reference numerals in FIGS. 4 and 5 showing how the variables in FIG. 4 are calculated as functions of input variables in FIG. 5. Having these functional relationships, the relationships in Table 1 with the variable names used in the co-pending algorithm patent application are used to make the calculations.

TABLE 3

| FIG. 4, present application | Expression using variables in FIG. 5 |
| --- | --- |
| NoFixedSizeCols 262 | (AvgNoColPerRow 316) * (1 - PerCentVarLengthCol 320) |
| TotalFixedBytesPerRow 264 | (AvgRowSize 318) - AvgVarLengthColSizePerTable 320) |
| NoVarCarCols 266 | (AvgNoColPerRow 316) * (PerCentVarLengthCol 320) |
| TotalVarCharBytesPerRow 272 | (AvgVarLengthColSizePerTable 320) |
| NoRows 220 | (AmtData 314) / (NoTables 312) / (AvgRowSize 318) |
| FillFactor 268 | FillFactor |
| NoFixedSizeICs 280 (FixedCol_K) | AvgNoFixedLenFieldPerCI 340 |
| TotalFixedBytesICPerRow 282 (FixedBytes_K) | ((AvgRowSize 318) - AvgVarLengthColSizePerTable 320)) * AvgNoFixedLenFieldPerCI 340) / ((AvgNoColPerRow 316) * (1 - PerCentVarLengthCol 320)) |
| NoVarCharICs 284 (VarCol_K) | (NoVarLenFieldsPerCI 350) |
| TotalVarCharBytesPerRow 286 (VarBytes_K) | (AvgVarLengthColSizePerTable 320)) * NoVarLenFieldPerCI 350) / ((AvgNoColPerRow 316) * ( PerCentVarLengthCol 320)) |
| NoFixedSizeICs 280 (FixedCol_X) | (AvgNoFixedLenFieldsPerNonCI 342) |
| TotalFixedBytesICPerRow 282 (FixedBytes_X) | ((AvgRowSize 318) - AvgVarLengthColSizePerTable 320)) * AvgNoFixedLenFieldsPerNonCI 342) / ((AvgNoColPerRow 316) * (1 - PerCentVarLengthCol 320)) |
| NoVarCharICs 284 (VarCol_X) | (NoVarLenFieldsPerNonCI 342) |
| TotalVarCharBytesPerRow 286 | (AvgVarLengthColSizePerTable 320)) |

TABLE 3-continued

| FIG. 4, present application | Expression using variables in FIG. 5 |
| --- | --- |
| (VarBytes_X) | * NoVarLenFieldsPerNonCI 342) / ((AvgNoColPerRow 316) * ( PerCentVarLengthCol 320)) |
| FillFactor 288 (FillFactor_K/X) | FillFactor |

Assumptions 352, and Parameters 306 and 210 thus correspond to the variable names and algorithms already discussed with respect to FIG. 4 and with respect to the co-pending algorithm patent application. In this way, the estimates or assumptions are used in the same algorithms used in the detailed database size calculation.

The above relations and the algorithm in the co-pending patent application are applied to a single table, a single physical order index, and a single non-physical order index. The remaining assumptions 352 and input parameters 310 are then used to calculate output DatabaseTotal 242, as shown in Table 4.

TABLE 4

| Aggregate Mass Storage Space Used | Expression |
| --- | --- |
| For tables | nPages_D_* PageSize * (NoTables 312) |
| For physical order indexes | nPages_K * PagesSize * (AvgNoCIPerTable 346) * (NoTables 312) |
| For nonphysical order indexes | (nPages_L + nPages_X) * PageSize * (AvgNoNonCIPerTable 340) * (NoTables 312) |

The DatabaseTotal 242 is then the sum of the above three results.

Referring now to FIG. 6, a simplified data flow diagram illustrates the data inputs and outputs for a method 400 used to calculate the total mass storage required for an Oracle 8.0x RDBMS system, where the total mass storage is represented by TotalMassStorage 202. Method 400 is the method termed "detailed" in the present application, based on detailed knowledge of the database requirements and input of those requirements. In particular, the detailed inputs are those inputs used to determine the required mass storage required for each table, including the storage required for the data and the indexes such as B-tree indexes. In a preferred embodiment, the detailed inputs and methods are those described in the co-pending algorithm patent application. Method 400 is similar in some respects to method 200 described with respect to a detailed calculation method for an SQL server system described in FIG. 4. Method 400 can also utilize an INITRANS_D 410 input parameter, which represents the number of transactions that can concurrently update a data block, and an INITRANS_X 412 input parameter, which represents the number of transactions that can currently update an index block. INITRANS_D and INITRANS_X can be used in calculation of the row size, as discussed in the co-pending algorithm patent application. INITRANS_D and INITRANS_X can enter into calculation of the BlkHeader_D and BlkHeader_X variables, which can in turn enter into the PageSize_A_D and PageSize_A_X determinations. In some embodiments, a PCT-FREE input is used in place of FillFactor 230, where FillFactor=100−PCTFREE.

Referring now to FIG. 7, a method 450 is illustrated for calculating the required total mass storage for a RDBMS system, such as an Oracle system, with the total requirement represented by TotalMassStorage 202. Method 450 uses estimated mass storage requirements for the table and index requirements, as opposed to the detailed method previously described. In particular, DataBaseTotal 242 can be calculated using estimates. A method or algorithm 452 is used to operate on several user entered inputs 306, several assumptions 456, and parameters 418. Parameters 418 are as previously described with respect to FIG. 4, and inputs 306 are as previously described with respect to FIG. 6. Outputs 212 are as previously described with respect to FIG. 4. Similarly named and numbered variables may, of course, have different values in the different methods and embodiments.

Assumptions 456 are newly introduced in FIG. 7 and can include: the average number of indexes per table, represented by AvgNoIndexesPerTable 458; the number of fixed length fields per index, presented by NoFixedLenFieldsPerIndex 460; and the number of variable length fields per index, represented by NoVarLenFieldsPerIndex 462. AvgNoIndexesPerTable 458 corresponds to AvgNoNonCIPerTable 340, NoFixedLenFieldsPerIndex 460 corresponds to AvgNoFixedLenFieldsPerNonCI 342, and NoVarLenFieldsPerIndex 462 corresponds to NoVarLenFieldsperNonCI 344 all previously discussed with respect to FIG. 5.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A computerized method for calculating the required bytes of mass storage for a database management system using detailed inputs and parameters, wherein the database management system includes at least one database which includes tables having a table size and having an index having an index size comprising:

providing table inputs for tables in the database sufficient to calculate estimated table size for each table;

providing index inputs for each index for each table in the database sufficient to estimate the index size for each table;

providing the input parameters for each database management system;

calculating a total storage requirement for the database using said table inputs, index inputs and input parameters;

calculating a storage requirement for the data base management system using said table inputs, index inputs and input parameters; and displaying said total storage requirements for database and database management system to a human user.

2. A computerized method for calculating the required bytes of mass storage for a database management system as recited in claim 1, wherein said calculated storage requirements have separate Operating System and application software space requirements, system table space requirements, scratch and sort space requirements, and log file space requirements.

3. A computerized method for calculating the required bytes of mass storage for a database management system as recited in claim 1, wherein said input parameters include parameters selected from the group consisting of a page size, a fill factor, a log file space, a temporary space as a percent of a formatted database size including indexes, a space required for Operating System and application software, a space required for system databases, a percent growth required for the database, and a page file space.

4. A computerized method for calculating the required bytes of mass storage for a database management system as recited in claim 1, wherein said input parameters include a page size.

5. A computerized method for calculating the required bytes of mass storage for a database management system as recited in claim 1, wherein said input parameters include a fill factor.

6. A computerized method for calculating the required bytes of mass storage for a database management system as recited in claim 1, wherein said input parameters include a percent growth required for the database.

7. A computerized method for calculating the required bytes of mass storage for a database management system using estimated inputs and parameters, wherein the database management system includes at least one database which includes tables having a table size and having an index having an index size comprising:

providing table inputs for tables in the database sufficient to calculate an estimated size for the database including a number of tables, an amount of data, an average number of columns per row, an average row size, a percent variable length columns, and an average variable length column size per table;

providing input parameters for each database management system;

providing a plurality of database table size assumptions;

calculating a storage requirement for the data base management system using said inputs, input parameters, and assumptions; and displaying said storage requirements to a human user.

8. A computerized method for calculating the required bytes of mass storage for a database management system as recited in claim 7, wherein said calculated storage requirements have separate Operating System and application software space requirements, system table space requirements, scratch and sort space requirements, and log file space requirements.

9. A computerized method for calculating the required bytes of mass storage for a database management system as recited in claim 7, wherein said input parameters include a page size.

10. A computerized method for calculating the required bytes of mass storage for a database management system as recited in claim 7, wherein said input parameters include a fill factor.

11. A computerized method for calculating the required bytes of mass storage for a database management system as recited in claim 7, wherein said input parameters include a percent growth required for the database.

12. A computerized method for calculating the required bytes of mass storage for a database management system as recited in claim 7, wherein said assumptions include assumptions selected from a group consisting of an average number of non-cluster indexes per table, an average number of fixed length fields per non-cluster index, an average number of cluster indexes per table, an average number of fixed length fields per cluster index, and a number of variable length fields per cluster index.

13. A computerized method for calculating the required bytes of mass storage for a database management system as recited in claim 7, wherein said assumptions include an average number of non-cluster indexes per table and an average number of fixed length fields per non-cluster index.

14. A computerized method for calculating the required bytes of mass storage for a database management system as recited in claim 7, wherein said assumptions include an average number of cluster indexes per table, an average number of fixed length fields per cluster index, and a number of variable length fields per cluster index.

15. A computerized method for calculating the required bytes of mass storage for a database management system using estimated inputs and parameters, wherein the database management system includes at least one database which includes tables having a table size and having an index having an index size comprising:

providing table inputs for tables in the database sufficient to calculate an estimated size for the database including a number of tables, an amount of data, an average number of columns per row, an average row size, a percent variable length columns, and an average variable length column size per table;

providing the input parameters for each database management system including a page size, a fill factor, a log file space, a temporary space as a percent of a formatted database size including indexes, a space required for Operating System and application software, a space required for system databases, a percent growth required for the database, and a page file space;

providing assumptions including an average number of non-cluster indexes per table, an average number of fixed length fields per non-cluster index, an average number of cluster indexes per table, an average number of fixed length fields per cluster index, and a number of variable length fields per cluster index;

calculating a storage requirement for the data base management system using said inputs, input parameters, and assumptions; and displaying said storage requirements to a human user.

* * * * *